United States Patent
Kim et al.

(10) Patent No.: US 9,479,988 B2
(45) Date of Patent: Oct. 25, 2016

(54) METHOD FOR ACCESSING NETWORK BY TERMINAL IN WIRELESS COMMUNICATION SYSTEM, AND DEVICE THEREFOR

(71) Applicant: LG Electronics Inc., Seoul (KR)

(72) Inventors: Sangwon Kim, Anyang-si (KR);
Sungjun Park, Anyang-si (KR);
Sunghoon Jung, Anyang-si (KR);
Youngdae Lee, Anyang-si (KR);
Seungjune Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 14/386,585

(22) PCT Filed: Mar. 15, 2013

(86) PCT No.: PCT/KR2013/002104
§ 371 (c)(1),
(2) Date: Sep. 19, 2014

(87) PCT Pub. No.: WO2013/141526
PCT Pub. Date: Sep. 26, 2013

(65) Prior Publication Data
US 2015/0049662 A1  Feb. 19, 2015

Related U.S. Application Data

(60) Provisional application No. 61/612,399, filed on Mar. 19, 2012, provisional application No. 61/614,516, filed on Mar. 23, 2012.

(51) Int. Cl.
*H04L 12/18* (2006.01)
*H04W 36/26* (2009.01)
*H04W 48/20* (2009.01)
*H04W 48/16* (2009.01)

(52) U.S. Cl.
CPC ........... *H04W 36/26* (2013.01); *H04L 12/189* (2013.01); *H04W 48/20* (2013.01); *H04W 48/16* (2013.01)

(58) Field of Classification Search
CPC ... H04W 48/20; H04W 36/22; H04W 36/24; H04W 48/06
See application file for complete search history.

(56) References Cited

U.S. PATENT DOCUMENTS

| | | | | |
|---|---|---|---|---|
| 8,121,602 | B2 * | 2/2012 | Yi | H04W 48/20 455/435.3 |
| 9,185,623 | B2 * | 11/2015 | Uemura | H04W 36/30 |
| 9,220,028 | B2 * | 12/2015 | Suzuki | H04W 24/10 |

(Continued)

OTHER PUBLICATIONS

3GPP TS 36.304 V10.5.0 Technical Specification Group Radio Access Network; Evolved Universal Terrestrial Radio Access (E-UTRA) User Equipment (UE) procedures in idle mode (Release 10), Mar. 14, 2012, see section 5.2.4 (pp. 18-27).

(Continued)

*Primary Examiner* — Ahmed Elallam
(74) *Attorney, Agent, or Firm* — Dentons US LLP

(57) ABSTRACT

A method for applying one or more priorities for cell re-selection by a terminal in a wireless communication system is disclosed in the present invention. More particularly, the method comprises the steps of: setting a first priority and a second priority, applying the first priority for the cell re-selection, and applying the second priority for the cell re-selection if connection establishment with a network is requested for.

13 Claims, 11 Drawing Sheets

(56) References Cited

U.S. PATENT DOCUMENTS

| | | | |
|---|---|---|---|
| 9,258,769 B2* | 2/2016 | Ore | H04W 36/0061 |
| 2009/0323624 A1* | 12/2009 | Kim | H04W 48/20 |
| | | | 370/329 |
| 2010/0099402 A1* | 4/2010 | Wu | H04W 76/027 |
| | | | 455/423 |
| 2010/0216469 A1* | 8/2010 | Yi | H04W 48/20 |
| | | | 455/435.3 |
| 2010/0240367 A1* | 9/2010 | Lee | H04W 36/0077 |
| | | | 455/435.2 |
| 2011/0165909 A1 | 7/2011 | Huang | |
| 2011/0201279 A1* | 8/2011 | Suzuki | H04W 24/10 |
| | | | 455/67.11 |
| 2011/0250888 A1 | 10/2011 | Ryu | |
| 2012/0135732 A1* | 5/2012 | Magadi Rangaiah | H04W 48/20 |
| | | | 455/434 |
| 2012/0236776 A1* | 9/2012 | Zhang | H04W 48/12 |
| | | | 370/312 |
| 2013/0095879 A1* | 4/2013 | Gupta | H04W 76/027 |
| | | | 455/525 |
| 2013/0223235 A1* | 8/2013 | Hu | H04W 36/04 |
| | | | 370/242 |
| 2013/0229974 A1* | 9/2013 | Xu | H04W 4/06 |
| | | | 370/312 |
| 2014/0349644 A1* | 11/2014 | Gomes | H04W 36/0083 |
| | | | 455/434 |

OTHER PUBLICATIONS

ETSI TS 136 523-1 V9.7.0 Technical Specification, E-UTRA and EPC; UE conformance specification; Part 1: Protocol conformance specification (3GPP TS 36.523-1 version 9.7.0 Release 9), Mar. 9, 2012, see section 6.1.2.

3GPP TS 25.367 V10.0.0, Technical Specification Group Radio Access Network Mobility procedures for Home Node B (HNB); Overall description; stage 2 (Release 10), Mar. 28, 2011, see section 7 (pp. 8-9).

* cited by examiner

FIG. 3
--Prior art--
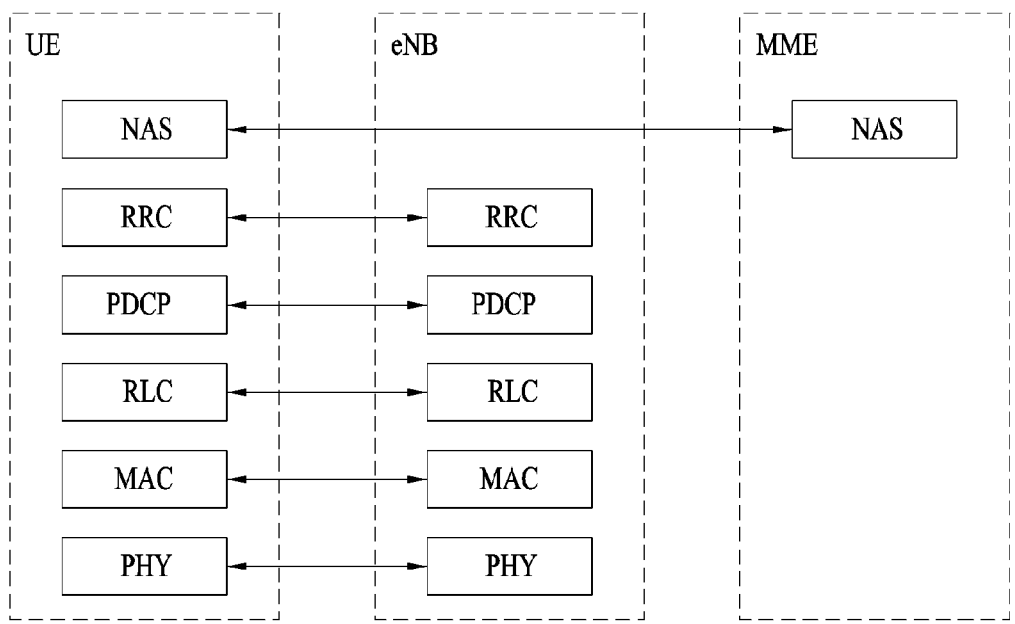
(a) control-plane protocol stack
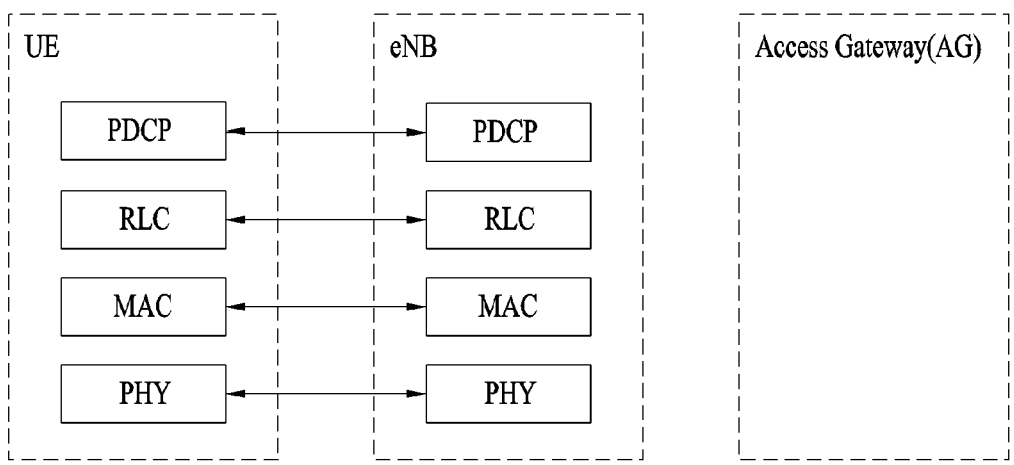
(b) user-plane protocol stack FIG. 5 --Prior art--

--Prior art--

FIG. 7   --Prior art--

METHOD FOR ACCESSING NETWORK BY TERMINAL IN WIRELESS COMMUNICATION SYSTEM, AND DEVICE THEREFOR

This application is a 35 USC §371 National Stage entry of International Application No. PCT/KR2013/002104 filed on Mar. 15, 2013, and claims priority to U.S. Provisional Application Nos. 61/612,399 filed on Mar. 19, 2012 and 61/614,516 filed on Mar. 23, 2012, all of which are hereby incorporated by reference in their entireties as if fully set forth herein.

TECHNICAL FIELD

The present invention relates to wireless communication system, and more particularly, to a method for enabling a user equipment to access a network in a wireless communication system and a device therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

Based on the aforementioned discussion, hereinafter, it is intended to suggest a method for enabling a user equipment to access a network in a wireless communication system and a device therefor.

Technical Solution

In one aspect of the present invention, a method for applying one or more priorities for cell reselection by a user equipment in a wireless communication system comprises the steps of setting a first priority and a second priority; applying the first priority for the cell reselection; and applying the second priority for the cell reselection if connection establishment with a network is requested for. In this case, the one or more priorities are associated with a predetermined frequency that provides a service, and the service is a multimedia broadcast multicast service (MBMS).

Preferably, the step of applying the first priority may include the step of setting a priority of the predetermined frequency to the first priority. In this case, the step of applying the second priority may include the step of setting the priority of the predetermined frequency to a priority signaled by the network.

Meanwhile, the method further comprises the step of determining whether to apply the second priority, based on a cause of the connection establishment. In this case, the cause of the connection establishment is mo-data (mobile originating data). However, this is only exemplary, and the cause of the connection establishment may be defined as one of emergency, high priority access, mt-Access (mobile terminating-Access), mo-Signaling (mobile originating-Signaling), mo-Data (mobile originating data), and delay tolerant access.

Preferably, the method further comprises the steps of receiving control information indicating whether to apply the second priority; and determining whether to apply the second priority, based on the control information. However, the method may further comprise the steps of receiving control information indicating whether to apply the first priority; and determining whether to apply the second priority, based on the control information. In more detail, if the control information indicates disallowance of application of the first priority, the second priority may be applied for the cell reselection. However, if the control information indicates allowance of application of the first priority, the first priority may be maintained for the cell reselection.

Meanwhile, the method further comprises the steps of receiving information on a specific connection cause from the network; and determining whether to apply the second priority, based on the information on the specific connection cause. In this case, if the cause of the connection establishment is the specific connection cause, the second priority is applied for the cell reselection. Alternatively, if the cause of the connection establishment is not the specific connection cause, the second priority may be applied for the cell reselection.

Advantageous Effects

According to the embodiment of the present invention, the user equipment may efficiently access the network in the wireless communication system. In more detail, even though a congestion status occurs in a cell that provides MBMS, the user equipment in which data little occurs may continue to receive MBMS, and the network may effectively control access of a predetermined user equipment in accordance with the congestion status by blocking access only of the predetermined user equipment.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 3 is a diagram illustrating structures of a control plane and a user plane of a radio interface protocol between a user equipment and an E-UTRAN based on the 3GPP radio access network standard;

BEST MODE FOR CARRYING OUT THE INVENTION

Hereinafter, configurations, operations, and other features of the present invention will be understood readily by the preferred embodiments of the present invention, examples of which are illustrated in the accompanying drawings.

Embodiments described hereinafter are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition.

Figure 1:
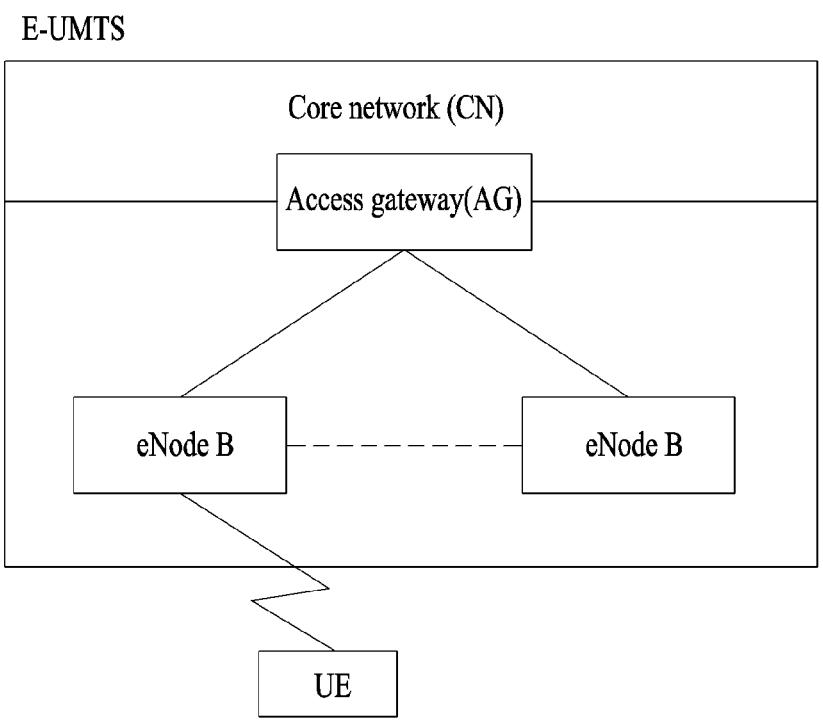
FIG. 1 is a diagram illustrating a network structure of an Evolved Universal Mobile Telecommunications System (E-UMTS) which is an example of a wireless communication system.
Figure 2:
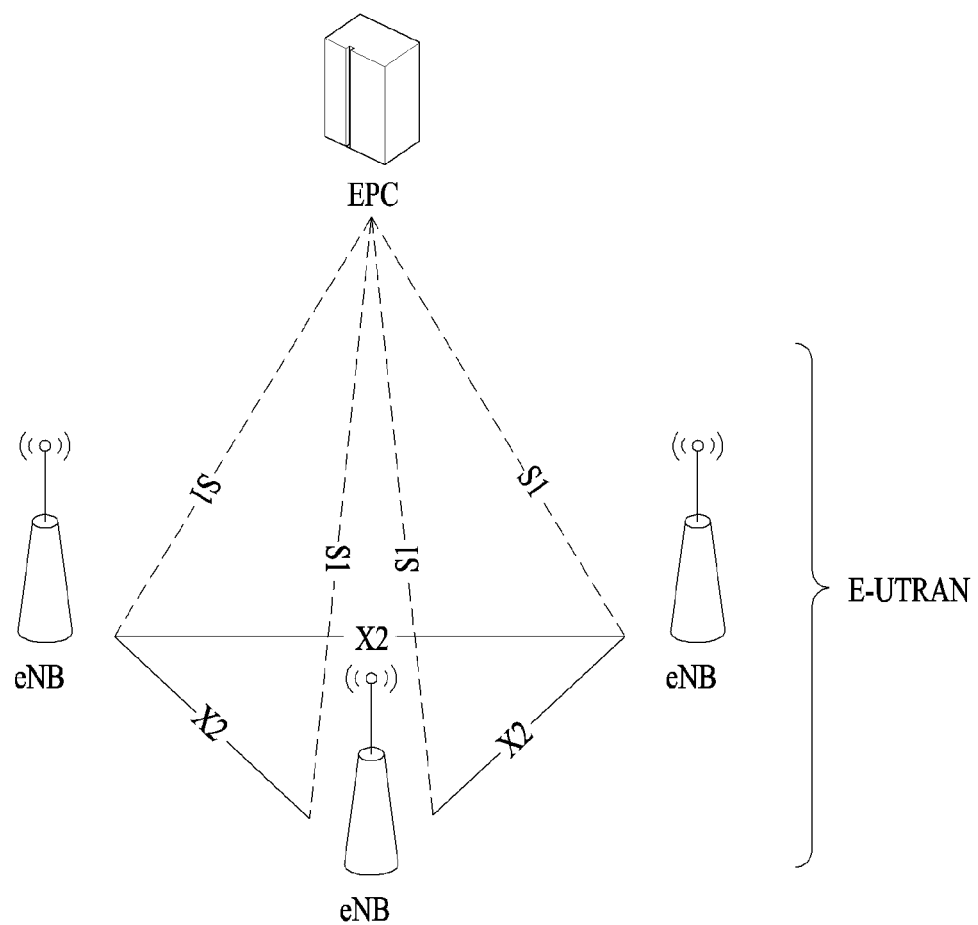
FIG. 2 is a diagram conceptionally illustrating a network structure of an evolved universal terrestrial radio access network (E-UTRAN)

FIG. 2 is a diagram conceptionally illustrating a network structure of an Evolved Universal Terrestrial Radio Access Network (E-UTRAN) which is an example of a mobile communication system. In particular, the E-UTRAN system is an evolved version of the conventional UTRAN system. The E-UTRAN includes cells (eNBs), which are connected with each other through an interface X2. Also, each of the cells is connected with a user equipment (UE) through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment. The access information or the ability information is mainly used for mobility management of the user equipment. The S-GW is a gateway having the E-UTRAN as an end point, and the PDN-GW is a gateway having a packet data network (PDN) as an end point.

FIG. 3 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other.

One cell constituting a base station eNB is set to one of bandwidths of 1.25, 2.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH).

Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 4:
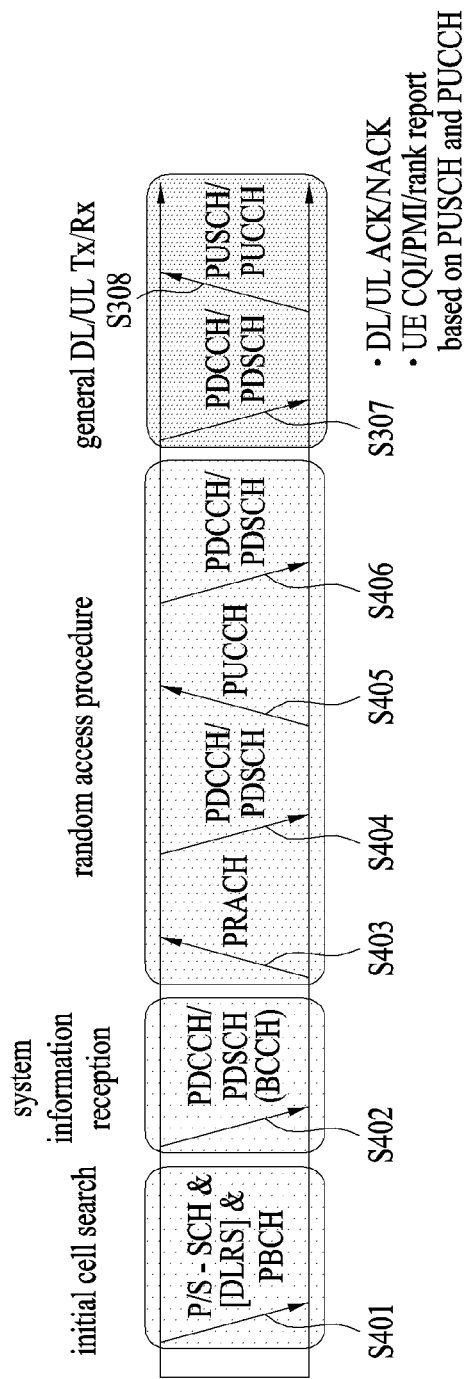
FIG. 4 is a diagram illustrating physical channels used in a 3GPP LTE system and a general method for transmitting a signal using the physical channels.

FIG. 4 is a diagram illustrating physical channels used in a 3GPP system and a general method for transmitting a signal using the physical channels.

The user equipment performs initial cell search such as synchronizing with the base station when it newly enters a cell or the power is turned on (S401). To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S402).

In the meantime, if the user equipment initially accesses the base station, or if there is no radio resource for signal transmission, the user equipment may perform a random access procedure (RACH) for the base station (S403 to S406). To this end, the user equipment may transmit a preamble of a specific sequence through a physical random access channel (PRACH) (403), and may receive a response message to the preamble through the PDCCH and the PDSCH corresponding to the PDCCH (S404). In case of a contention based RACH, a contention resolution procedure may be performed additionally.

The user equipment which has performed the aforementioned steps may receive the PDCCH/PDSCH (S407) and transmit a physical uplink shared channel (PUSCH) and a physical uplink control channel (PUCCH) (S408), as a general procedure of transmitting uplink/downlink signals. In particular, the user equipment receives downlink control information (DCI) through the PDCCH. In this case, the DCI includes control information such as resource allocation information on the user equipment, and has different formats depending on its usage.

In the meantime, the control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 5:
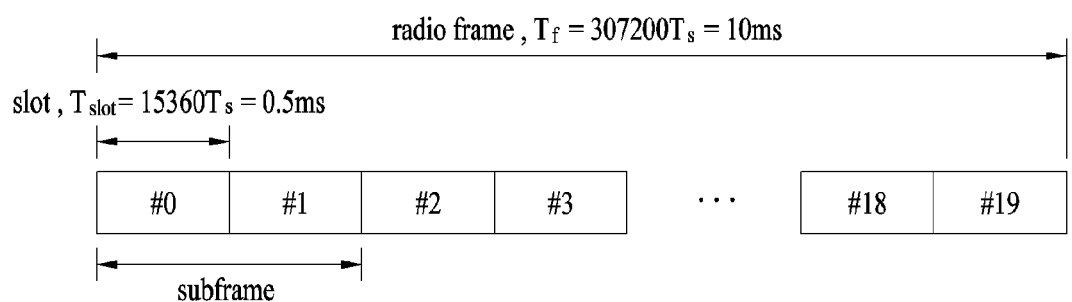
FIG. 5 is a diagram illustrating a structure of a radio frame used in an LTE system.

FIG. 5 is a diagram illustrating a structure of a radio frame used in an LTE system.

Referring to FIG. 5, a radio frame has a length of 10 ms ($327200 \times T_s$) and includes ten (10) subframes of an equal size. Each sub frame has a length of 1 ms and includes two slots. Each slot has a length of 0.5 ms ($15360T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Hereinafter, RRC state of the user equipment and RRC connection method will be described.

The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state.

Since the E-UTRAN may identify the presence of the user equipment which is in the RRC_CONNECTED state, on the basis of cell unit, the E-UTRAN may effectively control the user equipment. On the other hand, the E-UTRAN may not identify the user equipment which is in the RRC_IDLE state, on the basis of cell unit. In this case, the user equipment is managed by the core network (CN) on the basis of tracking area (TA) unit which is a local unit greater than the cell unit. In other words, in order that the user equipment which is in the RRC_IDLE state receives a service such as voice or data from the cell, the user equipment should be shifted to the RRC_CONNECTED state.

In particular, when the user initially turns on the power of the user equipment, the user equipment searches for a proper cell and then is maintained in the RRC_IDLE state in the corresponding cell. The user equipment maintained in the RRC idle state performs RRC connection establishment procedure with the RRC layer of the E-UTRAN only if the RRC connection is required, and then is shifted to the RRC_CONNECTED state. In this case, the case where the RRC connection is required may include a case where uplink data transmission is required due to calling attempt of the user or a case where a response message to a paging message received from the E-UTRAN should be transmitted.

Figure 6:
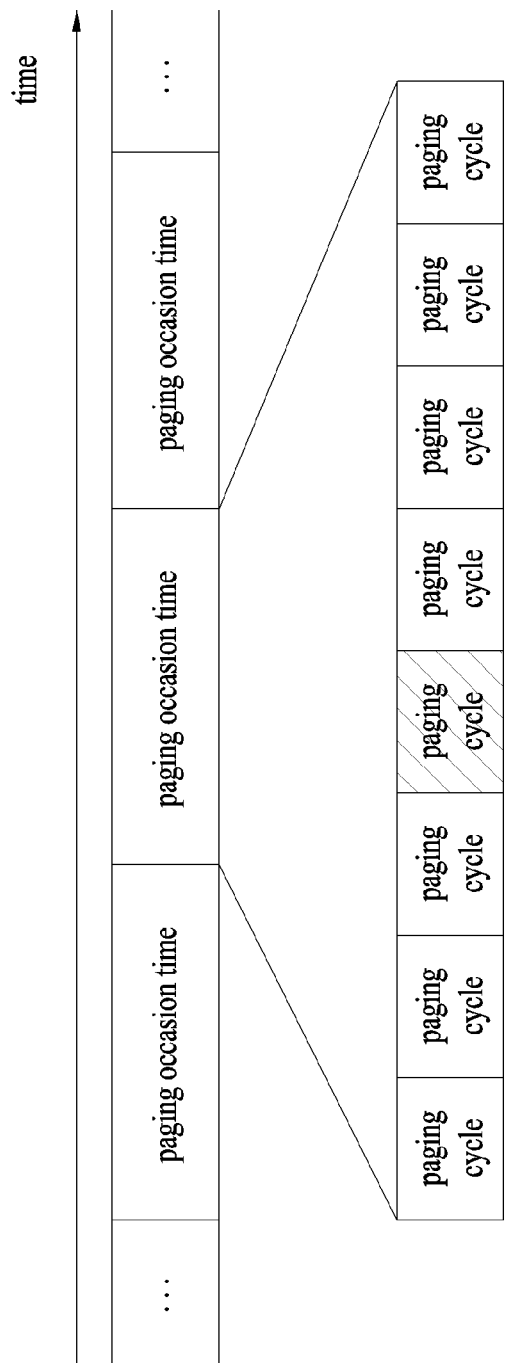
FIG. 6 is a diagram illustrating a general method for transmission and reception based on a paging message.

FIG. 6 is a diagram illustrating a general method for transmission and reception based on a paging message.

Referring to FIG. 6, the paging message includes a paging cause and a paging record of UE identity. When receiving the paging message, the user equipment may perform discontinuous reception (DRX) to reduce power consumption.

In more detail, a network includes several paging occasions (POs) per time period called paging DRX cycle, and a specific user equipment may acquire a paging message by receiving a specific paging occasion only. The specific user equipment does not receive a paging channel at the time except for the specific paging occasion time, and may be in a sleep mode to reduce power consumption. One paging occasion time corresponds to one TTI.

The base station and the user equipment use a paging indicator (PI) as a specific value for indicating transmission of the paging message. The base station may notify the user equipment of transmission of paging information by defining a specific identifier (for example, paging-radio network temporary identity; P-RNTI) as a usage of PI. For example, the user equipment wakes up per DRX cycle and receives one subframe to identify the presence of the paging message. If the P-RNTI exists in L1/L2 control channel (PDCCH) of the received subframe, the user equipment may identify that the paging message exists in the PDSCH of the corresponding subframe. Also, if the UE identity (for example, IMSI) exists in the paging message, the user equipment receives a service by responding to the base station (for example, RRC connection or system information reception).

The service provided to the network to the user equipment may be divided to three types. The user equipment recognizes the types of the cells differently depending on which service may be provided thereto. Meanwhile, in the 3GPP standard document, the service provided from the network to the user equipment may be divided into three types as illustrated in Table 1 below.

TABLE 1

| | |
|---|---|
| Limited service | Emergency call and ETWS (Earthquake and Tsunami Warning System) are provided. |
| Normal service | Public use service of general usage is provided. |
| Operator service | Service for communication network provider is provided. |

Also, the service types provided from the cell to the user equipment are divided, as illustrated in Table 2 below, in the 3GPP standard document.

TABLE 2

| | |
|---|---|
| Acceptable cell | Cell where the user equipment may receive limited service |
| Suitable cell | Cell where the user equipment may receive normal service |
| Barred cell | Cell designed as barred cell in system information |
| Reserved cell | Cell designated as reserved cell in system information |

In this case, the Acceptable cell is not barred in view of the corresponding user equipment, and satisfies a reference for cell selection of the user equipment. This cell allows the user equipment to receive limited services only such as emergency call and ETWS.

Also, the Suitable cell satisfies a condition of the acceptable cell and at the same time satisfies additional conditions. The additional conditions include that this suitable cell should belong to PLMN that may be accessed by the corresponding user equipment, and should be a cell that does not bar a tracking area (TA) update procedure of the user equipment. If the corresponding cell is a CSG (Closed Subscriber Group) cell, the user equipment should be a cell that allows the user equipment to access the cell as a CSG member.

The user equipment performs a cell selection procedure to receive the service from the cell and registers itself in the network. Also, if signal strength or quality between the user equipment and the cell is deteriorated due to mobility of the user equipment, the user equipment performs a cell reselection procedure to maintain transmission quality of data.

In the 3GPP standard document, the cell selection procedure is divided into two types as follows.

The first type of the cell selection procedure is an initial cell selection procedure, and is performed if the user equipment does not have previous information on a radio channel. In this case, the user equipment searches for all the radio channels to discover a proper cell and selects a cell corresponding to a radio channel having the most robust signal quality from the searched radio channels.

The second type of the cell selection procedure is a stored information cell selection procedure that uses stored information, and is performed if the user equipment previously stores information on the radio channel. In this case, since the user equipment already has the information on the radio channel, the user equipment may select the cell more quickly than the aforementioned initial cell selection procedure.

The following Equation 1 represents a reference for cell selection in the LTE system disclosed in the 3GPP standard document.

$$Srxlev = Q_{rxlevmeas} = (Q_{rxlevmin} + Q_{rxlevminoffset}) - Pcompensation > 0 \quad \text{[Equation 1]}$$

Parameters used in the Equation 1 are illustrated in Table 3 as follows.

TABLE 3

| | |
|---|---|
| $Q_{rxlevmeas}$ | Received level of measured cell (RSRP). |
| $Q_{rxlevmin}$ | Minimum required received level at cell (dBm) |
| $Q_{rxlevminoffset}$ | Offset of $Q_{rxlevmin}$ |
| Pcompensation | max($P_{EMAX} - P_{UMAX}$, 0) (dB) |
| $P_{EMAX}$ | Maximum transmission power (dBm) of user equipment to corresponding cell |
| $P_{UMAX}$ | Maximum transmission power (dBm) of RF unit of user equipment |

The user equipment receives the parameters of Table 3 through system information (SI), and performs the cell selection procedure by using the reference for cell selection of the Equation 1.

In the meantime, the aforementioned system information includes essential information that should be known by the user equipment to access the cell. Accordingly, the user equipment should have the latest system information before accessing the cell. Since the system information is the information that should be known by all the user equipments within one cell, the cell transmits the system information periodically.

The system information may be divided into a master information block (MIB), a scheduling block (SB), and a system information block (SIB). The MIB allows the user equipment to know physical configuration of the corresponding cell, for example, bandwidth information. The SIB is the aggregation of related system information. For example, a specific SIB includes only information of peripheral cells, and another SIB includes only information of an uplink radio channel used by the user equipment. The SB indicates transport information of the SIBs, for example, transmission period.

In the meantime, after the user equipment selects a cell through the cell selection procedure, signal strength or signal quality between the user equipment and the cell may be changed due to mobility of the user equipment or change of a radio environment. If quality of the selected cell is deteriorated, the user equipment may select another cell that provides better quality. If the user equipment reselects a cell, it generally selects a cell that provides signal quality better than that of the currently selected cell. This will be referred to as a cell reselection procedure.

The cell reselection procedure is basically intended to select a cell that provides the best quality to the user equipment, in view of quality of a radio signal. In addition to quality of the radio signal, the network may determine priority per frequency and notify the user equipment of the determined priority. The user equipment that has received the priority first considers the priority prior to quality basis of the radio signal during the cell reselection procedure. This cell reselection procedure may be divided as illustrated in Table 4 below in accordance with radio access technology (RAT) of the cell and frequency features.

TABLE 4

| | |
|---|---|
| Intra-frequency cell reselection | Reselection of cell having the same RAT and the same center-frequency as those of serving cell |
| Inter-frequency cell reselection | Reselection of cell having the same RAT as that of serving cell and having center-frequency different from that of serving cell |
| Inter-RAT cell reselection | Reselection of cell that uses RAT different from that used by serving cell |

Figure 7:
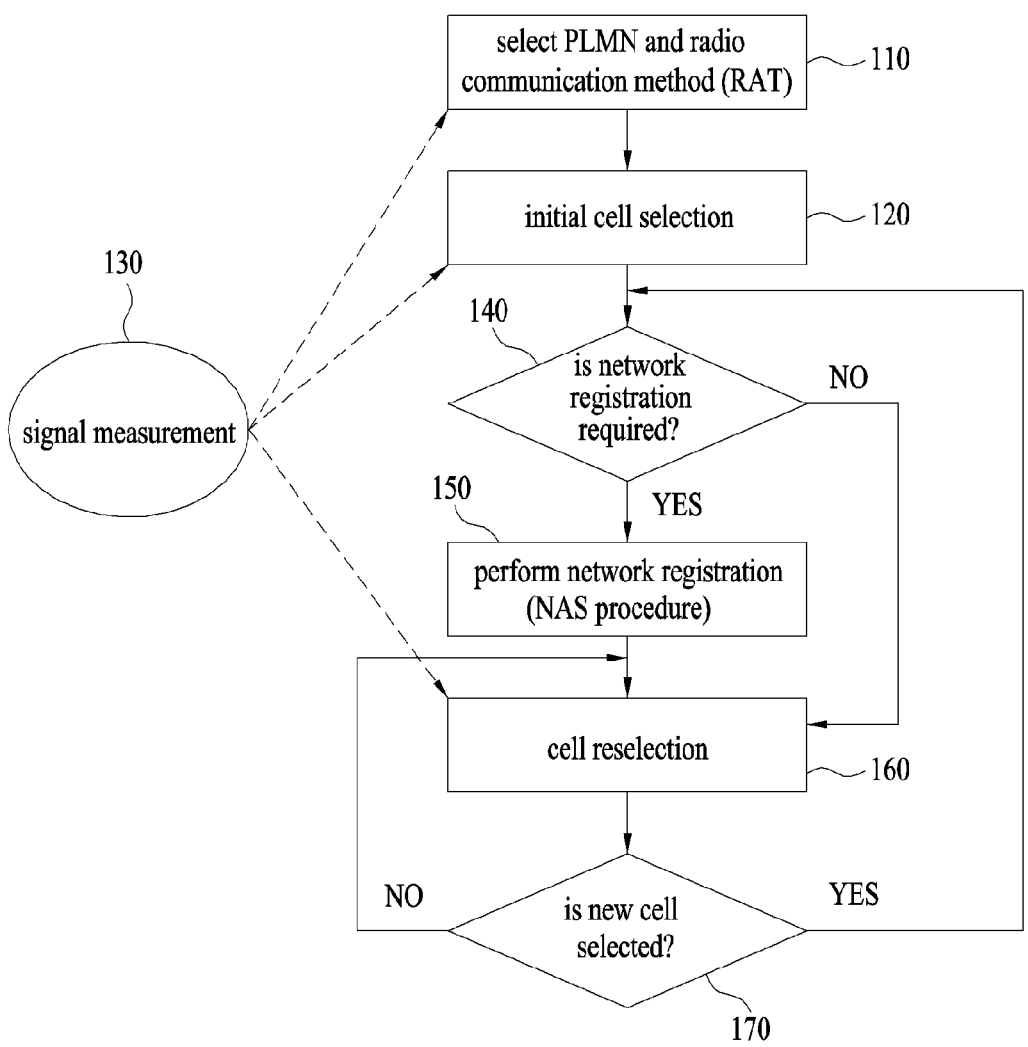
FIG. 7 is a flow chart illustrating an operation of a user equipment when the user equipment is powered on in an LTE system.

FIG. 7 is a flow chart illustrating an operation of a user equipment when the user equipment is powered on in an LTE system.

Referring to FIG. 7, if the power of the user equipment is turned on at step 110, the user equipment automatically or manually selects a public land mobile network (PLMN) which is the network where the user equipment desires to receive a service and a radio access technology (RAT) for communication. The PLMN and RAT information may be selected by a user of the user equipment, and information stored in universal subscriber identity module (USIM) may be used as the PLMN and RAT information. In this case, the user equipment measures a signal transmitted from the cell periodically or non-periodically, that is, reference signal or pilot signal as shown at step 130, and then calculates cell quality information by using features of the physical signal related to signal strength or signal to noise/interference ratio.

Afterwards, at step 120, the user equipment performs a cell selection procedure for selecting a cell having the greatest value from cells of which measured cell quality information is greater than a reference value. The reference value means a value defined in the system to assure quality of a physical signal in data transmission and reception. Accordingly, the reference value may be varied depending on the RAT which is applied, and may depend on the Equation 1 in the LTE system.

Afterwards, the user equipment receives system information transmitted from the cell periodically, and registers its information (for example, International Mobile Subscriber Identity, IMSI) in the network to receive the service from the network by using the received system information at step 150. The user equipment does not register its information in the network whenever the user equipment selects the cell, and registers its information in the network if information (for example, tracking area identity, TAI) of the network, which is received from the SI, is different from information of the network, which is known by itself, as shown at steps 140 and 170.

Also, at step 160, if strength or quality of the signal measured from the serving cell is lower than a value measured from the neighboring cell, the user equipment reselects one of other cells that provide signal features better than those of the cell accessed by the user equipment. This procedure will be referred to as a cell reselection procedure in comparison with cell selection of the step 120. At this time, a time-based restriction condition (for example, cell selection timer) may be set to prevent the cell from being reselected frequency in accordance with variation of signal features.

Hereinafter, a multimedia broadcast multicast service (MBMS) will be described. The MBMS is a kind of a broadcast/multicast service, and is the service that transmits a multimedia data packet to a plurality of user equipments at the same time. The 'broadcast/multicast service' and 'MBMS' in this specification may be replaced with other terminologies such as 'point to multipoint service' and 'multicast and broadcast service (MBS)'. The MBMS is based on IP multicast, and the user equipments receive same multimedia data by sharing resources required for data packet transmission. Accordingly, if the user equipments of a certain level, which use the MBMS, exist in the same cell, resource efficiency may be increased. Since the MBMS has no relation with the RRC connected mode, the user equipment which is in the idle mode may receive the MBMS.

A logic channel for MBMS (MBMS control channel (MCCH)) or MBMS traffic channel (MTCH) may be mapped into a transport channel MCH (MBMS channel). The MCCH transmits RRC message, which includes MBMS related common control information, and the MTCH transmits traffic of a specific MBMS. One MCCH exists per one MBSFN (MBMS single frequency network) area where the same MBMS information or traffic is transmitted, and if a plurality of MBSFN areas are provided from one cell, the user equipment may receive a plurality of MCCHs.

If MBMS related RRC message is changed in a specific MCCH, the PDCCH transmits MBMS-radio network temporary identity (M-RNTI) and an MCCH indicator indicating a specific MCCH. The user equipment that supports MBMS may identify that the MBMS related RRC message has been changed in the specific MCCH, by receiving the M-RNTI and the MCCH indicator through the PDCCH, and may receive the specific MCCH. RRC message of the MCCH may be changed per change period, and is broadcasted repeatedly per repetition period.

The user equipment may be provided with a dedicated service while it is being provided with the MBMS. For example, some user may perform chatting by using an instant messaging (IM) service simultaneously with viewing a TV through the MBMS. In this case, the MBMS will be provided through the MTCH received together by a plurality of user equipments, and the service individually provided to each user equipment like the IM service will be provided through a dedicated bearer such as a dedicated control channel (DCCH) or a dedicated traffic channel (DTCH).

In one area, some base station may use a plurality of frequencies at the same time. In this case, in order to efficiently use radio resources, the network may select one of the plurality of frequencies and provide the MBMS at the selected frequency only, and may provide the dedicated bearer to each user equipment at all the frequencies. In this case, if the user equipment that has received the service by using the dedicated bearer at the frequency to which the MBMS is not provided desires to receive the MBMS, the corresponding user equipment should perform handover to the frequency to which the MBMS is provided. To this end, the user equipment transmits MBMS interest indication to the base station. In other words, if the user equipment desires to receive the MBMS, the user equipment transmits MBMS interest indication to the base station. If the MBMS interest indication is received, the base station recognizes that the user equipment desires to receive the MBMS, and shifts the user equipment to the frequency to which the MBMS is provided. In this case, the MBMS interest indication means information desired by the user equipment to receive the MBMS, and additionally includes information on a frequency to which the user equipment desires to shift.

In the related art, the user equipment, which desires to receive a specific MBMS, first identifies information on a frequency, to which the specific MBMS is provided, and broadcast time information. If the MBMS is already being broadcast or starts to be broadcast soon, the user equipment sets a priority of the frequency to which the MBMS is provided, at a highest level. The user equipment performs the cell reselection procedure by using the reset frequency priority information, whereby the user equipment shifts to the cell, which provides the MBMS, and receives the MBMS.

Generally, the user equipment of RRC idle state performs inter-frequency cell reselection on the basis of frequency priority set by the network. However, when the user equipment desires to receive the MBMS, the user equipment regards a specific frequency as another frequency priority not the frequency priority set by the network, and performs cell reselection. In this way, the operation, which is performed by the user equipment for cell reselection on the basis of the frequency priority reset by the user equipment, may be referred to as autonomous priority handling.

If the autonomous priority handling is performed for the reason of reception of the MBMS, a plurality of user equipments may be concentrated on a specific frequency at the same time, and congestion may occur in the corresponding cell. In order to prevent such congestion, the network may notify the user equipment of information for controlling application of the autonomous priority handling of the user equipment, that is, autonomous priority controlling information in the form of broadcasting. Alternatively, the user equipment may receive the autonomous priority controlling information even after performing cell reselection on the basis of autonomous priority. If autonomous priority is indicated as 'disallowed' by the autonomous priority controlling information, the user equipment returns to the frequency priority before application of the autonomous priority.

However, all the user equipments shifted to the specific frequency to receive the MBMS do not affect the congestion. Accordingly, access control that depends on the autonomous priority controlling information only disturbs reception of the MBMS through the user equipments that do not affect the congestion or little affect the congestion.

Accordingly, to solve the aforementioned problem, the present invention suggests a method for determining application of autonomous priority on the basis of the autonomous priority controlling information received by the user equipment from the network.

In more detail, the user equipment, which is in RRC idle state and tries RRC connection to a camp-on cell, performs cell reselection by applying frequency priority (hereinafter, referred to as signaled priority or default priority) before application of autonomous priority and requests the reselected cell of RRC connection if the camp-on cell camped on from the network receives the autonomous priority controlling information that disallows autonomous priority application of the user equipment. In this case, the default priority is the frequency priority before the user equipment reconfigures the priority by applying the autonomous priority, and is the priority configured, by the network, for the user equipment.

The autonomous priority controlling information may include an indicator that allows or disallows the autonomous priority application of the user equipment. If the indicator included in the autonomous priority controlling information indicates permission of the autonomous priority application, the user equipment tries RRC connection to a currently camp-on cell while maintaining the autonomous priority. If the indicator included in the autonomous priority controlling information indicates disallowance of the autonomous priority application, the user equipment performs cell reselection by applying the default priority when requesting RRC connection, and requests the reselected cell of RRC connection.

In this case, the user equipment may receive information indicating the congestion of the cell camped on from the network, and the autonomous priority controlling information may be acquired from information indicating the congestion of the network, that is, congestion information. If the network transmits congestion information indicating overload of the cell, the user equipment may recognize the congestion indicator as information on disallowance of the autonomous priority application. If the network transmits congestion information indicating that there is no congestion of the cell, the user equipment may recognize the congestion indicator as information on permission of the autonomous priority application.

An application target of the aforementioned method may be limited to the user equipment that has performed cell reselection by application of the autonomous priority.

In the meantime, the network may set a time for disallowing autonomous priority application of the user equipment by defining an autonomous priority disallow timer and signaling the autonomous priority disallow timer. Afterwards, the user equipment, which has applied the default priority in accordance with control information that disallows autonomous priority application, drives the autonomous priority disallow timer. Accordingly, the user equipment does not apply the autonomous priority, which sets MBMS frequency as the first priority, while the timer is being driven. However, if the autonomous priority disallow timer expires, the user equipment may set the MBMS frequency as the first priority by applying the autonomous priority.

Figure 8:
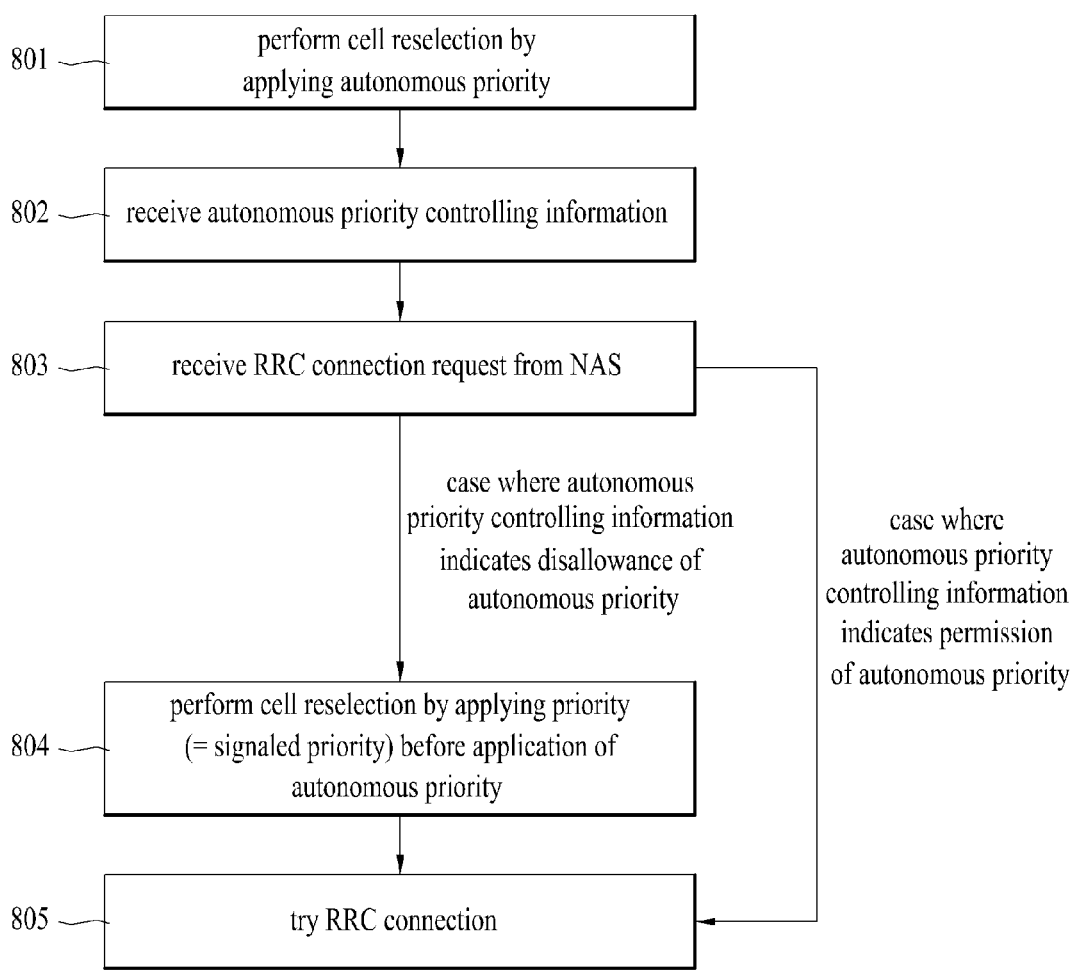
FIG. 8 is a flow chart illustrating RRC connection method according to the present invention.

FIG. 8 is a flow chart illustrating RRC connection method according to the present invention.

Referring to FIG. 8, at step 801, the user equipment performs cell reselection by applying the autonomous priority. Afterwards, at step 802, the user equipment may receive the autonomous priority controlling information. Alternatively, the user equipment may receive information indicating the congestion status of the cell camped on from the network, and the autonomous priority controlling information may be acquired from information indicating the congestion status of the network, that is, congestion information.

Subsequently, the user equipment receives RRC connection request from a non-access stratum (NAS) layer at step 803. If the autonomous priority controlling information indicates disallowance of the autonomous priority application, the user equipment performs cell reselection by applying the default priority at step 804 and requests the reselected cell of RRC connection at step 805.

On the other hand, if the autonomous priority controlling information indicates permission of the autonomous priority application, the user equipment tries RRC connection to the currently camp-on cell at step 805 while maintaining the autonomous priority.

In the meantime, the network may disallow the frequency priority of the user equipment that tries RRC connection due to a specific cause. If congestion is serious, the network may disallow frequency priority of all the user equipments, which try RRC connection, regardless of a connection cause. In case of congestion that may handle signaling such as TAU, the network may reduce RRC connection efficiently in accordance with congestion by disallowing the frequency priority of the MBMS user equipment that tries RRC connection for a reason of mo-Data.

In more detail, the network may limit RRC connection to RRC connection caused by a specific connection cause when the user equipment performs cell reselection by applying the default priority. The connection cause may be one or more of emergency, high priority access, mobile terminating (mt)-access, mobile originating (mo)-signaling, mo-Data, and delay tolerant access. For reference, mt-Access is the connection cause for paging reception of the user equipment, mo-Signaling is the connection cause for uplink control signal transmission of the user equipment, and mo-Data is the connection cause for uplink data signal transmission. Accordingly, the user equipment may receive the specific connection cause from the network. Information on the specific connection cause may be included in the autonomous priority controlling information.

In this case, when the user equipment performs cell reselection by applying the default priority, the RRC connection may be limited to RRC connection caused by the specific connection cause indicated by the network, or RRC connection caused by the other connection cause except for the specific connection cause indicated by the network. Alternatively, the specific connection cause may previously be configured for the user equipment that supports the MBMS. In this case, the user equipment may limit the RRC connection to RRC connection caused by the specific connection cause without indication of the network.

Figure 9:
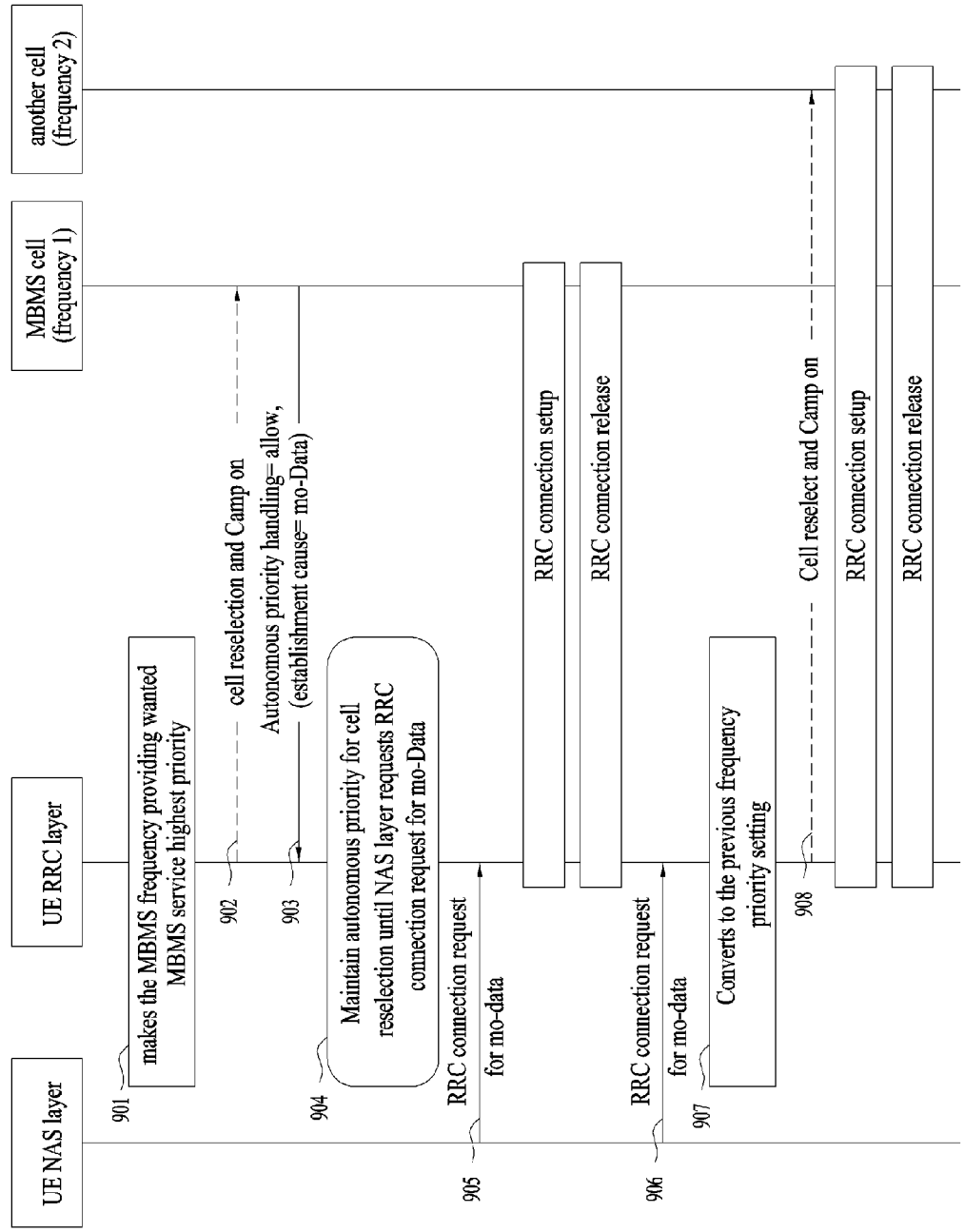
FIG. 9 is a signal flow chart illustrating RRC connection method according to the present invention.

FIG. 9 is a signal flow chart illustrating RRC connection method according to the present invention.

Referring to FIG. 9, the user equipment, which is in idle state and does not desire to receive the MBMS, applies the autonomous priority to allow the frequency to which the MBMS service is provided, to have the highest priority at step 901, and camps on the MBMS cell that provides a desired MBMS by performing the cell reselection procedure at step 902.

Subsequently, the user equipment may receive the autonomous priority controlling information at step 903. In particular, the autonomous priority controlling information of the present invention may include an indicator indicating application or not of the autonomous priority and information on the specific connection cause. In FIG. 9, for convenience of description, it is assumed that the indicator indicates permission of the autonomous priority application and indicates mo-Data as the specific connection cause. Afterwards, the user equipment receives the MBMS while maintaining the autonomous priority application at step 904 until the NAS layer requests RRC connection for a reason of mo-Data.

In the meantime, if the NAS layer of the user equipment requests RRC connection for a reason of mo-Signaling at step 905, the user equipment tries RRC connection to the selected cell while maintaining the autonomous priority application. However, if the NAS layer of the user equipment requests RRC connection for a reason of mo-Data at step 906, the user equipment applies default priority setup at step 907. In other words, after applying the default priority (or signaled priority) which is the frequency priority prior to application of the autonomous priority, the user equipment camps on a cell of another frequency not the MBMS frequency at which congestion occurs, by performing the cell reselection procedure on the basis of the default priority at step 908.

In the meantime, the network may control an autonomous priority application disallow rate of the user equipment that tries RRC connection in accordance with congestion. To this end, the network may forward information indicating the autonomous priority application disallow rate together with or separately from the autonomous priority controlling information. The user equipment that has received RRC connection request from the NAS layer generates a random number within a certain range, and if the random number is smaller than the autonomous priority application disallow rate, maintains the autonomous frequency priority. On the other hand, if the generated random number is greater than the autonomous priority application disallow rate, the user equipment returns to the previous frequency priority set by the network, that is, the default priority. If congestion is high, the network may disallow the autonomous priority application to a large proportion of user equipments that try RRC connection by lowering the autonomous priority application disallow rate. If congestion is relatively low, the network may disallow the frequency priority of a small proportion of user equipments by increasing the autonomous priority application disallow rate.

Figure 10:
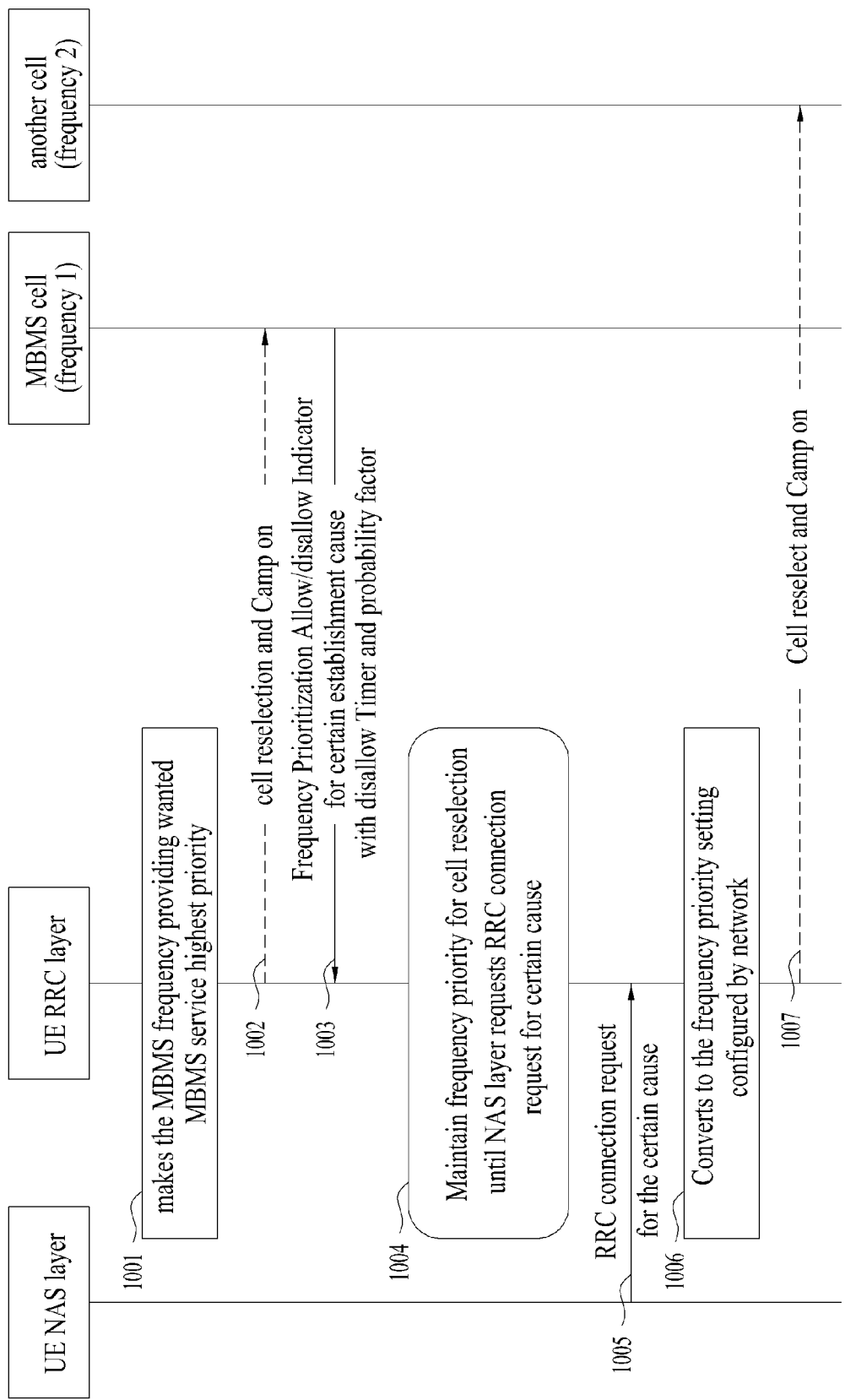
FIG. 10 is another signal flow chart illustrating RRC connection method according to the present invention.

FIG. 10 is another signal flow chart illustrating RRC connection method according to the present invention.

Referring to FIG. 10, the user equipment which is in idle state and desires the MBMS applies the autonomous priority to allow the frequency, to which the MBMS is provided, to have the highest priority at step 1001, and camps on the MBMS cell that provides a desired MBMS by performing the cell reselection procedure at step 1002.

Subsequently, the user equipment may receive the autonomous priority controlling information at step 1003. In particular, the autonomous priority controlling information may include an indicator indicating whether to apply the autonomous priority and information on a specific connection cause. Also, unlike FIG. 9, it is noted that the autonomous priority controlling information of FIG. 10 may include the autonomous priority application disallow rate and the autonomous priority disallow timer.

In FIG. 10, it is assumed that the indicator indicates permission of the autonomous priority application and indicates mo-Data as the specific connection cause. Afterwards, the user equipment receives the MBMS while maintaining the autonomous priority application at step 1004 until the NAS layer requests RRC connection for a reason of mo-Data.

In the meantime, if the NAS layer of the user equipment requests RRC connection for a reason of mo-Data at step 1005, the user equipment generates a random number within a certain range, and if the random number is smaller than the autonomous priority application disallow rate included in the autonomous priority controlling information, maintains the autonomous frequency priority. However, if the generated random number is greater than the autonomous priority application disallow rate, the user equipment applies the previous frequency priority set by the network, that is, the default priority at step 1006. In other words, after applying the default priority (or signaled priority) which is the frequency priority prior to application of the autonomous priority, the user equipment camps on a cell of another frequency not the MBMS frequency at which congestion occurs, by performing the cell reselection procedure on the basis of the default priority at step 1007.

In this case, the user equipment drives the autonomous priority disallow timer, and does not apply the autonomous priority that sets the MBMS frequency to the first priority while the timer is being driven. However, if the autonomous priority disallow timer expires, the user equipment may set the MBMS frequency to the first priority by applying the autonomous priority.

According to the present invention, even though congestion occurs in the cell that provides the MBMS, the user equipment in which data little occur may continue to receive the MBMS, and the network may effectively control access of a predetermined user equipment in accordance with the congestion status by blocking access only of the predetermined user equipment.

Figure 11:
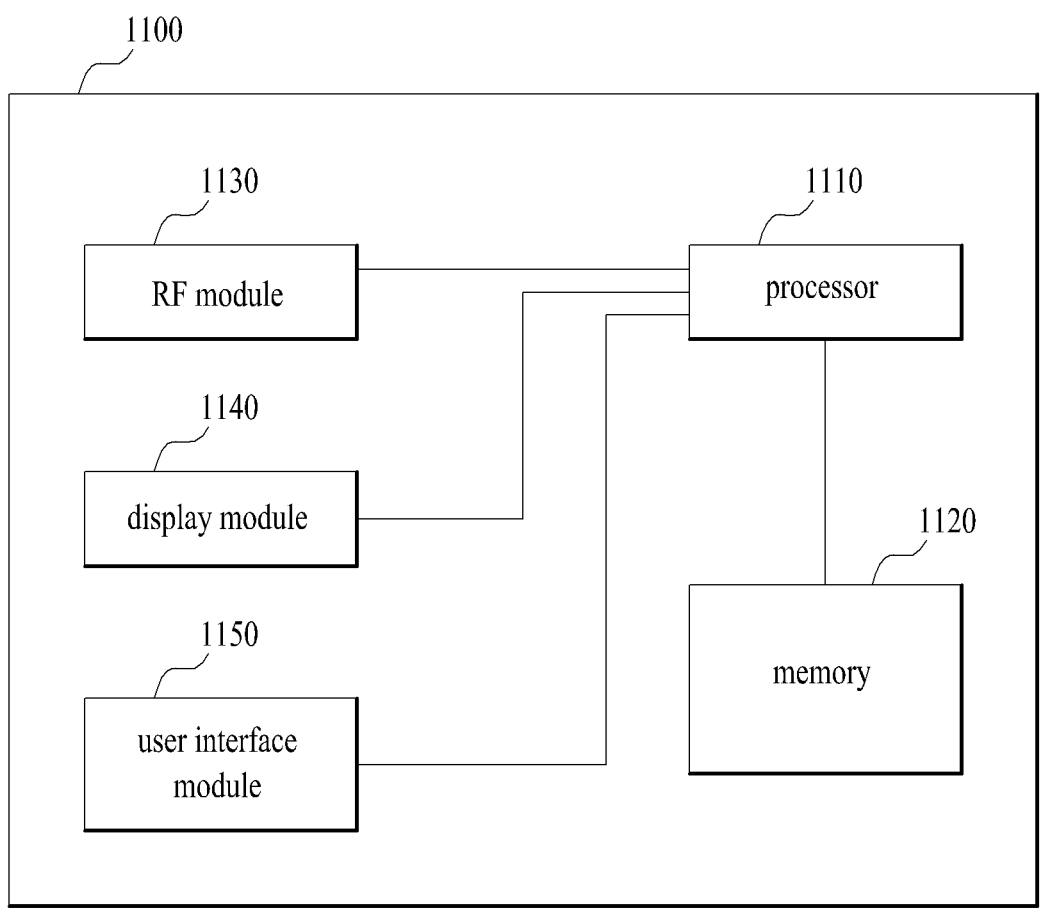
FIG. 11 is a block diagram illustrating a communication device according to one embodiment of the present invention.

FIG. 11 is a block diagram illustrating a communication device according to one embodiment of the present invention.

Referring to FIG. 11, the communication device 1100 includes a processor 1110, a memory 1120, a radio frequency (RF) module 1130, a display module 1140, and a user interface module 1150.

The communication device 1100 is illustrated for convenience of description, and some of its modules may be omitted. Also, the communication device 1100 may further include necessary modules. Moreover, some modules of the communication device 1100 may be divided into segmented modules. The processor 1110 is configured to perform the operation according to the embodiment of the present invention illustrated with reference to the drawings. In more detail, the detailed operation of the processor 1110 will be understood by the disclosure described with reference to FIG. 1 to FIG. 10.

The memory 1120 is connected with the processor 1110 and stores an operating system, an application, a program code, and data therein. The RF module 1130 is connected with the processor 1110 and converts a baseband signal to a radio signal or vice versa. To this end, the RF module 1130 performs analog conversion, amplification, filtering and frequency uplink conversion, or their reverse processes. The display module 1140 is connected with the processor 1110 and displays various kinds of information. Examples of the display module 1140 include, but not limited to, a liquid crystal display (LCD), a light emitting diode (LED), and an organic light emitting diode (OLED). The user interface module 1150 is connected with the processor 1110, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiment according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for enabling a user equipment to access a network in a wireless communication system and the device therefor have been described based on the 3GPP LTE system, the method and device may be applied to various wireless communication systems in addition to the 3GPP LTE system.

The invention claimed is:

1. A method for applying one or more priorities for cell reselection by a user equipment in a Radio Resource Connection (RRC) Idle state in a wireless communication system, the method comprising:
    setting a first priority and a second priority;
    applying the first priority for the cell reselection;
    receiving an indicator indicating disallowance of the first priority or allowance of the first priority from a cell;
    maintaining the first priority by ignoring the indicator until
    connection establishment with a network is requested by NAS layer; and
    when the connection establishment with the network is requested, determining whether to apply the second priority based on the indicator.

2. The method according to claim 1, wherein the one or more priorities are associated with a predetermined frequency that provides a service.

3. The method according to claim 2, wherein the step of applying the first priority includes setting a priority of the predetermined frequency to the first priority.

4. The method according to claim 3, wherein the step of applying the second priority includes setting the priority of the predetermined frequency to a priority signaled by the network.

5. The method according to claim 1, further comprising the whether to apply the second priority is determined further based on a cause of the connection establishment.

6. The method according to claim 5, wherein the cause of the connection establishment is mo-data (mobile originating data).

7. The method according to claim 5, wherein the cause of the connection establishment is emergency, high priority access, mt-Access (mobile terminating-Access), mo-Signaling (mobile originating-Signaling), mo-Data (mobile originating data), and delay tolerant access.

8. The method according to claim 1, further comprising:
when the indicator indicates disallowance of first priority, applying the second priority for the cell reselection, and
when the indicator indicates allowance of the first priority, applying the first priority for the cell reselection.

9. The method according to claim 1, further comprising receiving information on a specific connection cause from the network; and determining whether to apply the second priority, based on the information on the specific connection cause.

10. The method according to claim 9, wherein, if the cause of the connection establishment is the specific connection cause, the second priority is applied for the cell reselection.

11. The method according to claim 9, wherein, if the cause of the connection establishment is not the specific connection cause, the second priority is applied for the cell reselection.

12. The method according to claim 9, wherein the service is a multimedia broadcast multicast service (MBMS).

13. The user equipment in a wireless communication system, the user equipment comprising:
a transmitter and receiver for transmitting and receiving a signal from a network; and
a processor operatively connected to the transmitter and receiver,
the processor configured to set a first priority and a second priority, apply the first priority for the cell reselection, and control the receiver to receive an indicator indicating disallowance of the first priority or allowance of the first priority from a cell, maintain the first priority by ignoring the indicator until connection establishment with a network is requested by NAS layer and determine whether to apply the second priority based on the indicator, when the connection establishment with the network is requested.

* * * * *